United States Patent [19]

Brotz et al.

[11] 3,970,624

[45] July 20, 1976

[54] COATING COMPOSITION

[75] Inventors: Walter Brotz, Gersthofen; Manfred Engelmann, Augsburg; Klaus Rieger, Gersthofen, all of Germany

[73] Assignee: Hoechst Aktiengesellschaft, Frankfurt am Main, Germany

[22] Filed: Dec. 5, 1974

[21] Appl. No.: 529,696

[30] Foreign Application Priority Data

Dec. 11, 1973 Germany............................ 2361506

[52] U.S. Cl............................. 260/28.5 A; 526/1; 526/350; 526/351
[51] Int. Cl.$^2$........................................ C08L 91/06
[58] Field of Search......... 260/28.5 A, 93.7, 94.9 B, 260/94.9 E

[56] References Cited

UNITED STATES PATENTS

| | | | |
|---|---|---|---|
| 3,054,652 | 9/1962 | Heumann | 260/93.7 |
| 3,322,708 | 5/1967 | Wilson | 260/28.5 A |

Primary Examiner—Lewis T. Jacobs
Assistant Examiner—H. H. Fletcher
Attorney, Agent, or Firm—Connolly and Hutz

[57] ABSTRACT

A coating composition essentially consisting of a polypropylene having a crystalline fraction of from 20 to 60 % by weight and a melt viscosity of from 5,000 to 200,00 cP at 170° C is applicable by a roll coater. The coatings have a high elasticity, toughness and good adherence on the support and are sealable.

2 Claims, No Drawings

COATING COMPOSITION

The present invention relates to a coating composition on the basis of a propylene polymer with a definite proportion of crystalline and amorphous fractions.

The coating of paper by extrusion of plastic materials is practised on a large scale. The coatings should be smooth, glossy and water repellent and protect the surface from the penetration of fat, water and the like. In most cases high pressure and low pressure polyethylene and isotactic, so-called crystalline polypropylene are used for this purpose.

Mixtures consisting of a preferably crystalline polypropylene, a hydrocarbon wax and a copolymer of ethylene and an unsaturated ester have also been proposed (cf. U.S. Pat. No. 3,322,708) as well as compositions for molten film coating obtained by thermal decomposition of a mixture of a high molecular weight polyolefin, inter alia polypropylene, and a hydrocarbon wax (cf. British Pat. No. 1,009,079). Still further, it has been proposed to coat paper, cardboard, textile fabrics and the like, with an aqueous dispersion of polypropylene having a degree of crystallinity of 50 to 100 % and a high molecular weight (cf. Belgian Pat. No. 561,459).

Due to its stickiness non-crystalline atactic polypropylene is used, in the first place, in the manufacture of adhesives, for Example adhesives suitable for producing laminated paper. Known adhesives consist, for example, of mixtures of atactic polypropylene with waxes or resins (cf. German Offenlegungsschrift 2,024,156).

It has also been proposed to use atactic polypropylene for making non-sticky coatings, but in this case its proportion in the coating composition should be rather low (cf. German Offenlegungsschrift 2,024,156). Coatings composed of crystalline polypropylene, atactic polypropylene and waxes are likewise known (cf. German Offenlegungsschrift 2,163,624). In these coating compositions the proportion of atactic polypropylene should be in the range of from 5 to 35 and preferably from 5 to 25 % by weight. A higher content of atactic polypropylene detrimentally affects the properties of the coating, especially as regards its stickiness.

It has now been found that a propylene polymer having a definite proportion of crystalline to amorphous fractions and containing up to 80 % by weight of the amorphous fraction can be used, surprisingly even alone, for the manufacture of very valuable non-sticky coatings on paper and other supporting webs.

The present invention therefore provides a composition for molten film coating of supporting webs essentially consisting of 70 to 100 % by weight of a polypropylene having a crystalline fraction of from 20 to 60 % by weight and a melt viscosity at 170° C of from 5,000 to 200,000 cP and 0 to 30 % by weight of a hydrocarbon wax.

It has not been known so far that polypropylene of the aforesaid type can be used for the manufacture of coatings on paper and this is surprising even to the expert, since the experiences gained with atactic polypropylene and mixtures containing same suggest that materials containing a preponderant proportion of atactic polypropylene or a polypropylene having a high content of atactic fraction are unsuitable for the manufacture of valuable non-sticky coatings.

The polypropylene used for making the coating composition according to the invention has a melt viscosity, measured at 170° C, of from 5,000 to 200,000 cP, preferably 20,000 to 100,000 cP, and a crystalline fraction of from 20 to 60 and preferably 30 to 50 % by weight.

The polypropylene is prepared by known processes using Ziegler type catalysts. It is preferably made by polymerization in solution at a temperature above 100° C. Especially suitable for synthetizing a polypropylene having the aforesaid properties is a mixed catalyst composed of the reaction product of the chloride and/or an alcoholate of tetravalent titanium and an alcoholate and/or a hydroxyl group containing compound of magnesium and optionally a chloride or an alcoholate of silicium or aluminium, the reaction product necessarily containing alkoxy groups and chlorine, and an organo-aluminium compound, the atomic proportion of aluminium to chlorine being in the range of from 4:1 to 0.8:1. The viscosity and crystallinity of the polypropylene can be simply adjusted within the desired limits by variation of the temperature and the catalyst composition (cf. German Offenlegungsschrift 2,329,641).

To determine the crystalline portion of the polypropylene several methods are known. Besides the differential thermoanalysis and infrared analysis there is often used as measurement the portion which cannot be extracted with boiling heptane or diethyl ether in a Soxhlet apparatus. Within the scope of the present invention the latter method was exclusively practised using heptane as extracting agent. With increasing crystallinity and melt viscosity of the polypropylene the surface of the coatings become harder and smoother.

Up to 30 % of a hydrocarbon wax can be added to the aforesaid polypropylene, whereby the melt viscosity of the coating composition is reduced and the processing may be facilitated. The hydrocarbon wax may further improve the sliding properties of the coating and reduce the tendency to blocking.

Suitable hydrocarbon waxes are especially paraffins, microcrystalline waxes or polyethylene waxes having a molecular weight in the range of from 800 to 3,000. Hydrocarbon waxes having a chain length of from 30 to 200 and preferably from 60 to 150 carbon atoms being preferred.

The coating compositions according to the invention may contain the usual stabilizers, for example tertiary butyl cresol, antistatic agents, for example glycerol monostearate, sliding agents, for example oleic acid amide, as well as fillers such as titanium dioxide, calcium carbonate, or dyestuffs in amounts currently used by the expert.

The coating composition in accordance with the invention can be applied to the supporting web by a conventional process, suitable supports being paper, cardboard, and metal foils, for example foils of aluminium, steel and tin.

The coating is advantageously applied by rolling. The processing temperature is far below the temperature of the usual extrusion coating owing to the comparatively low melt viscosity of the coating composition.

As compared with the composition according to the invention, coating masses made with the use of commercial crystalline polypropylene (for example as described in German Offenlegungsschrift 2,163,624) have such high molecular weights and melt viscosities that they cannot be applied by a roll. However, extrusion coating is much more expensive and complicated. The manufacture of relatively low viscous, highly crystalline polypropylene suitable for roll coating would be possible by thermal decomposition of commercial high molecular weight polypropylene, but such a process is very complicate and expensive, and, moreover, it yields brittle and rigid products.

A further important advantage of the low processing temperature in roll coating resides in the lower strain exerted on materials that are readily damaged at elevated temperature and by oxidation. It is known that polypropylene belongs to this type of materials. Consequently, it is possible to reduce the addition of stabilizers and even to produce coatings that decompose more easily under atmospheric conditions and the action of light.

The coatings made with the composition according to the invention are characterized by a high elasticity and toughness, by sealing properties and good adherence on the support. The impermeability to steam and fat is good, especially in the case of compositions containing a hydrocarbon wax. The coating is tasteless, odorless and colorless, and transparent when applied in the usual layer thickness.

The following examples illustrate the invention. The coating tests are performed on a roll coater at a temperature of the coating composition of about 180° C.

EXAMPLE 1

Polypropylene having a melt viscosity of 58,000 cP at 170° C and a crystalline portion of 35 % is applied to paper with the addition of 1 % by weight of oleic acid amide. The coated paper has a glossy surface and does not break on the bending lines as ascertained by testing the impermeability to fat according to DIN 53 116.

EXAMPLE 2

Polypropylene having a melt viscosity of 68,000 cP and a crystalline portion of 30 % is mixed in the molten state with 10 % by weight of paraffin having a melting point of 95° C and 0.5 % by weight of oleic acid amide. The mixture is used to coat paper. The coated paper has a smooth and readily sliding surface and can be sealed at 140°C. Steam and fat are retained to a great extent (according to DIN 53 122 and DIN 53 116). A film being made to examine the flexibility and having a layer thickness of about 0.3 mm shows no damage after 10 bendings.

EXAMPLE 3

Polypropylene having a melt viscosity of 120,000 cP and a crystalline portion of 40 % is mixed in the molten state with 20 % by weight of a paraffin having a melting point of 60° C and applied on paper. The coated paper has a high gloss, it can be sealed and has a good impermeability to steam and fat.

EXAMPLE 4

Polypropylene having a melt viscosity of 100,000 cP and a crystalline portion of 48 % is mixed in the molten state with 15 % of a polyethylene wax having a molecular weight of 1,200 and a softening point of 107° C and the mixture is used for coating paper.

The coating is characterized by a high flexibility. It can be sealed at 145° C. The surface has a high gloss and a low tendency to blocking.

EXAMPLE 5

An aluminum foil is coated with the composition specified in Example 2. The composition has a good adherence to the metal and the coated foil can be well sealed with paper at 140° C.

COMPARATIVE EXAMPLE A

Paper is coated with a polypropylene having a viscosity of 160,000 cP and a crystallinity of 95 %. Owing to the high melting temperature and the high viscosity an unobjectionable coating is not obtained. A film made with the polypropylene and having a thickness of 0.3 mm breaks on bending.

COMPARATIVE EXAMPLE B

Paper is coated with a mixture of 10 % by weight of paraffin having a melting point of 95° C and 90 % by weight of atactic polypropylene having a melt viscosity of 18,000 cP. The coating obtained is so sticky that unrolling of the paper roll is not troublefree.

What is claimed is:
1. A coating composition for molten film coating of supporting webs consisting essentially of
    70 to 90% by weight of a polypropylene having a crystalline portion of 20 to 60% by weight and a melt viscosity at 170°C of from 5,000 to 200,000 cP and
    10 to 30% by weight of a hydrocarbon wax.
2. A process for molten film coating of supporting webs, which comprises applying to said film a coating composition consisting essentially of
    70 to 90% by weight of a polypropylene having a crystalline portion of 20 to 60% by weight and a melt viscosity at 170°C of from 5,000 to 200,000 cP and
    10 to 30% by weight of a hydrocarbon wax.

* * * * *